(12) United States Patent
Evans et al.

(10) Patent No.: US 9,468,031 B2
(45) Date of Patent: *Oct. 11, 2016

(54) METHOD AND SYSTEM FOR MANAGING COMMUNICATIONS BETWEEN A MOBILE DEVICE AND A MACHINE

(71) Applicant: Cranbrook Technology, LLC, Wilmington, DE (US)

(72) Inventors: Gregory M. Evans, Raleigh, NC (US); Richard J. Walsh, Raleigh, NC (US); Eric Gregg, Portsmouth, NH (US)

(73) Assignee: Cranbrook Technology, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/880,791

(22) Filed: Oct. 12, 2015

(65) Prior Publication Data
US 2016/0037575 A1 Feb. 4, 2016

Related U.S. Application Data

(63) Continuation of application No. 12/950,527, filed on Nov. 19, 2010, now Pat. No. 9,161,157.

(51) Int. Cl.
| | |
|---|---|
| *H04H 20/71* | (2008.01) |
| *H04W 76/02* | (2009.01) |
| *H04W 4/00* | (2009.01) |

(Continued)

(52) U.S. Cl.
CPC ............ *H04W 76/023* (2013.01); *H04W 4/005* (2013.01); *H04W 4/021* (2013.01); *H04W 8/005* (2013.01); *H04W 12/06* (2013.01);

(Continued)

(58) Field of Classification Search
CPC ...... H04W 48/00; H04W 4/06; H04W 88/02
USPC ................ 370/312, 328, 389–427, 466–473; 709/201, 217, 224
See application file for complete search history.

(56) References Cited

U.S. PATENT DOCUMENTS

| | | |
|---|---|---|
| 7,330,714 B2 | 2/2008 | Rosenberg |
| 7,567,178 B2 | 7/2009 | Boyer et al. |

(Continued)

OTHER PUBLICATIONS

Komel, B., et al., "Location Based Advertising," The First International Conference on Mobile Business (M-Business 2002), Jul. 8-9, 2002, http://www.e-lba.com/yellowmap_location%20based%20advertising%20mbusiness%20conference%202002.pdf, 7 pages.

(Continued)

*Primary Examiner* — Iqbal Zaidi

(57) ABSTRACT

A method and apparatus for managing communications between a mobile device and a machine are described. A mobile device wirelessly discovers a plurality of mobile machine identifiers (IDs) of a plurality of mobile machines, each machine adapted to wirelessly communicate attribute information about the first machine upon receipt of an authorization indication. The mobile device selects a first machine of the plurality of machines and sends a machine identifier (ID) obtained from the first machine to a server. The mobile device receives an authorization indication from the server that authorizes communication with the first machine. The mobile device sends the authorization indication to the first machine, and in response to sending the authorization indication, receives attribute information from the first machine.

20 Claims, 9 Drawing Sheets

(51) Int. Cl.
*H04W 8/00* (2009.01)
*H04W 12/06* (2009.01)
*H04L 29/06* (2006.01)
*H04W 4/02* (2009.01)
*H04W 4/04* (2009.01)
*H04W 12/08* (2009.01)

(52) U.S. Cl.
CPC .............. *H04L 63/107* (2013.01); *H04W 4/02* (2013.01); *H04W 4/043* (2013.01); *H04W 12/08* (2013.01)

(56) References Cited

U.S. PATENT DOCUMENTS

| | | |
|---|---|---|
| 2002/0198845 A1 | 12/2002 | Lao et al. |
| 2005/0102233 A1 | 5/2005 | Park et al. |
| 2006/0252530 A1* | 11/2006 | Oberberger ............. G07F 17/32 463/29 |
| 2007/0270163 A1 | 11/2007 | Anupam et al. |
| 2009/0029721 A1 | 1/2009 | Doraswamy |
| 2009/0144145 A1 | 6/2009 | Yoon et al. |
| 2010/0239093 A1 | 9/2010 | Hotta |

OTHER PUBLICATIONS

Ververidis, C., et al., "Mobile Marketing Using a Location Based Service," Mobile Multimedia Laboratory, Athens University of Economics, Proc. 1st International Conference on Mobile Business (M-Business 2002) Jul. 8-9, 2002, http://mm.aueb.gr/publications/2002-Mobile-M-Business.pdf, 11 pages.

Chakraborty, D., et al., "Service Discovery in the Future for Mobile Commerce," ACM Crossroads, vol. 7, Issue 2, Dec. 2000, http://www.acm.org/crossroads/xrds7-2/service.html, accessed May 12, 2010, 8 pages.

* cited by examiner

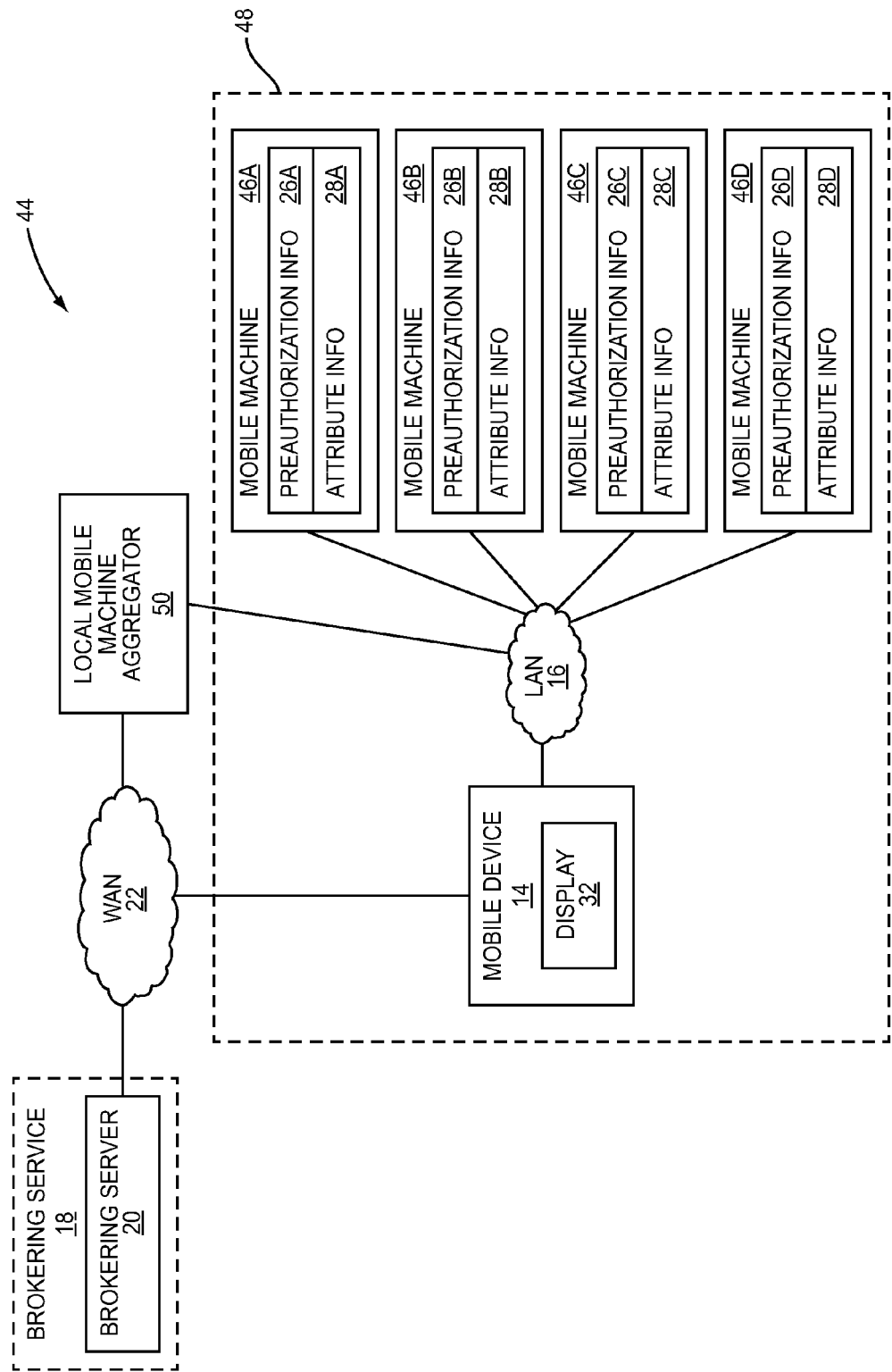

METHOD AND SYSTEM FOR MANAGING COMMUNICATIONS BETWEEN A MOBILE DEVICE AND A MACHINE

CROSS-REFERENCE TO RELATED APPLICATIONS

This application is a continuation of U.S. Pat. No. 9,161, 157, which was filed Nov. 19, 2010, the disclosure of which is hereby incorporated by reference in its entirety.

FIELD OF THE DISCLOSURE

Embodiments described herein relate generally to communications between a mobile device and a machine, and in particular to managing communications between a mobile device and a machine.

BACKGROUND

Mobile devices increasingly have the ability to communicate with other devices via a local wireless technology, such as Wi-Fi®, Bluetooth®, or ZigBee®. A common use of this capability enables a mobile device, such as a smart phone, to automatically find, and with user authorization connect to, a local area network via a wireless adapter that offers significantly higher bandwidth than wide area network (WAN) technologies. Machines, such as automobiles, also increasingly have local wireless technology capabilities. For example, newer automobiles frequently have the capability of communicating with a user's cellular phone via a local wireless technology to provide hands-free operation of the phone while driving.

There are situations where a user is in proximity to a machine and may desire to know information about the machine. For example, the user may have a choice of multiple different vehicles to rent, and may desire to access information about the vehicles. Such information may be provided, for example, by web service companies such as CARFAX®, which might include information such as maintenance records to help the user decide which of the multiple different vehicles to select. Similarly, a potential purchaser of a vehicle such as an automobile may be in proximity to an automobile that has been offered for sale, and may be interested in accessing information about the automobile, such as asking price, number of hours the automobile has been operated, previous maintenance performed on the automobile, and the like. Accordingly, there is a need for a mobile-device-to-machine managing method that is capable of controlling communications between a mobile device and a mobile or stationary machine.

SUMMARY

Embodiments herein relate to brokering, e.g., managing, communications between a mobile device and one or more machines. In one embodiment, a mobile device determines that a machine in a commerce zone desires to communicate with the mobile device. The mobile device wirelessly sends a mobile machine identifier (ID) obtained from the mobile machine to a server. The mobile device receives from the server an authorization indication, such as a data access key, which authorizes the mobile device to communicate with the machine. The mobile device sends the authorization indication to the machine, and in response receives attribute information that identifies attributes of the mobile machine, such as maintenance records of the mobile machine, previous states in which the mobile machine has been registered, or the like.

In one embodiment relating to a mobile machine, a mobile machine registers with a service. The service provides the mobile machine with a mobile machine ID and a data access key. The mobile machine uses the mobile machine ID to identify itself to a mobile device, and uses the data access key to verify that the mobile device has been authorized to communicate with the mobile machine.

Predefined commerce zones may be identified and may be used to limit where authorized communications between the mobile device and the mobile machine occur. In one embodiment, zone identification information identifying predefined commerce zones may be periodically broadcast over a wide area network (WAN) such that the mobile device and the mobile machine may obtain the zone information and store the zone information in respective local storages. Prior to initiating communications, the mobile device and the mobile machine may obtain current location information, and may engage in communications only if the current location is within a predefined commerce zone. In another embodiment, location information may be obtained by the mobile device and communicated to a server. The server may condition authorization to communicate with the mobile machine based on whether the location information identifies a location within a predefined commerce zone.

In one embodiment, the machine may provide preauthorization information to the mobile device prior to receiving an authorization indication, such as a data access key, from the mobile device. The preauthorization information may include, for example, presentation information and a machine ID. The presentation information may be suitable for display to a user of the mobile device, and may identify certain information about the machine that the user may find useful in deciding whether the user desires to obtain attribute information about the machine. For example, in the context of an automobile that is being offered for sale, the presentation information may include the year of the automobile, the automobile's mileage, and the asking price for the automobile. Based on the presentation information, the user of the mobile device may decide whether to obtain authorization from the server to obtain the attribute information about the automobile.

In one embodiment, communications between the mobile device and the server, and between the server and the machine, if any, are via a wireless WAN, such as a 3G or 4G (e.g., LTE, WiMAX) cellular WAN. Communications between the mobile device and the machine are via a wireless local area network (LAN), such as a Wi-Fi®, Bluetooth®, or ZigBee® LAN.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4 is a block diagram of a system in which additional embodiments disclosed herein may be practiced;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed herein relate to brokering, or managing, communications between a mobile device and a machine. In some embodiments the machine is a mobile machine, and in other embodiments the machine may be a stationary machine. For example, upon determination by the mobile device that a mobile machine, such as an automobile, desires to communicate with the mobile device, the mobile device communicates with a server and seeks authorization to communicate with the mobile machine. If the server authorizes communications, the mobile machine receives an authorization indication, such as a data access key, from the server, and provides the data access key to the mobile machine. The mobile device then receives from the mobile machine attribute information that identifies attributes of the mobile machine that are unique to the mobile machine.

One example of such a communication relates to an individual who is interested in renting an automobile, and uses the individual's mobile device to communicate with one or more automobiles located in a car rental agency parking lot to obtain information from the automobiles that may be useful to the individual in determining which automobile to rent. Another example relates to an individual interested in purchasing a used automobile who uses the individual's mobile device to communicate with one or more automobiles located in a used car lot to obtain information about the automobiles that may be useful to the individual in determining which automobile to test drive.

Figure 1:
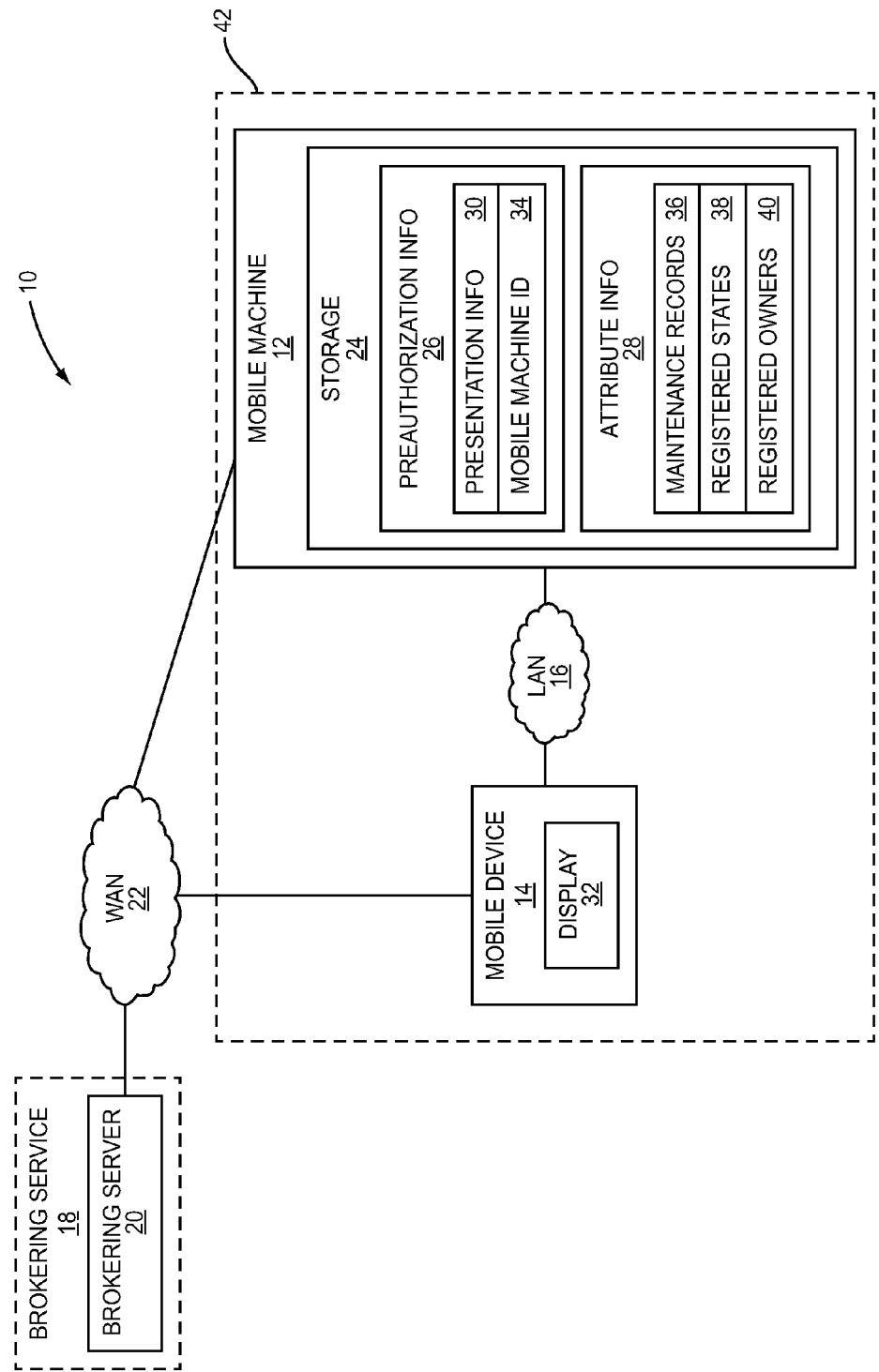
FIG. 1 is a block diagram of an exemplary system in which embodiments disclosed herein may be practiced.

FIG. 1 is a block diagram of a system 10 in which embodiments disclosed herein relating to communications between a mobile device and a mobile machine may be practiced. While FIG. 1 is discussed in the context of a mobile machine, those skilled in the art will realize that the discussion is similarly applicable to a stationary machine. The system 10 includes a mobile machine 12 that is capable of communicating with a mobile device 14 via a wireless local area network (LAN) 16. As used herein, the phrase "mobile machine" shall refer to a machine capable of communicating wirelessly and whose primary purpose is transportation of a human. Thus, at any given point in time, the mobile machine 12 may be at a location that is different from the location of the mobile machine 12 at a previous point in time. For example, a mobile machine 12 may comprise an automobile, a truck, a boat, an airplane, a motorcycle, a bicycle, a wheelchair, or the like.

The mobile device 14 may comprise any suitable portable communications device whose primary purpose is to provide data to a human, such as a cellular phone, a feature phone, a smartphone, a laptop computer, a personal digital assistant (PDA), an electronic reader or tablet such as the Apple® iPad™, or the like. The wireless LAN 16 may comprise any suitable wireless LAN or wireless personal area network technology, including, for example, Wi-Fi®, Bluetooth®, or ZigBee®.

The mobile machine 12 may be registered with a brokering service 18. The brokering service 18 may comprise any entity that offers an authorization service, as described in greater detail herein, to authorize communications between the mobile device 14 and the mobile machine 12. Examples of the brokering service 18 include a national service provider that sells access to a wide area network (WAN) technology for communication purposes, such as a cellular phone service provider, or a classified advertising entity that provides advertising and for a fee authorizes communications between the mobile device 14 and the mobile machine 12. The brokering service 18 operates a brokering server 20 which can communicate with the mobile device 14 and/or the mobile machine 12 via a WAN 22. The WAN 22 may comprise any WAN technology, such as, for example, 3G (e.g., GSM, CDMA) or 4G (e.g., LTE, WiMAX) data telecommunications technologies.

In an alternative embodiment, a brokering service may not be used. In such embodiment, the authorization information may be entered manually, such as by an operator of the mobile device 14 or mobile machine 12, or downloaded from a remote device, such as via the Internet, to the mobile device 14 or mobile machine 12 by a source other than a brokering service, such as, for example, the automobile owner. In yet another embodiment, the mobile machine 12 may interact with the mobile device 14 without the need for an authorization for communication to take place between the mobile device 14 and the mobile machine 12.

The mobile machine 12 includes a storage 24 that stores information which may be communicated to the mobile device 14 via the wireless LAN 16. The information may include, for example, preauthorization information 26 and post-authorization attribute information 28. The preauthorization information 26 and the post-authorization attribute information 28 may be formatted using a standardized description language, such as XML. The preauthorization information 26 may include presentation information 30 that may be displayable on a display 32 of the mobile device 14 and which may be useful to a user of the mobile device 14 in deciding whether or not the user is interested in obtaining the attribute information 28. The preauthorization information 26 may also include a mobile machine identifier (ID) 34 which may, as discussed in greater detail herein, be used by the mobile device 14 to obtain authorization from the brokering server 20 to receive the attribute information 28 from the mobile machine 12. The presentation information 30 may comprise information suitable to aid, or entice, the user of the mobile device 14 to obtain authorization from the brokering server 20 to receive the attribute information 28. For example, where the brokering service 18 comprises a classified advertising entity, and the mobile machine 12 is an automobile that is being offered for sale, the preauthorization information 26 may comprise basic information about the mobile machine 12, such as year, mileage, asking price, and/or features common to the particular make and model of the mobile machine 12, such as horsepower, interior volume, type of transmission, and the like. Such information may be displayed on the display 32 and viewed by the user.

In one embodiment, the preauthorization information 26 may be stored in the storage 24 by an owner of the mobile machine 12 via a laptop computer. The laptop computer may communicate with the mobile machine 12 wirelessly via the wireless LAN 16, or the mobile machine 12 may offer an external device interface, such as a USB interface, which enables the laptop to couple directly to the mobile machine 12. In another embodiment, an online service may be utilized which is capable of communicating with the mobile machine 12 via the WAN 22, and is also capable of communicating with the owner of the mobile machine 12 via, for example, a computer. The online service may be affiliated with the brokering service 18, or may be independent of the brokering service 18.

The attribute information 28 may comprise information that is unique to the particular mobile machine 12, such as maintenance records 36; registered state information 38; registered owner information 40; or information regarding movement or status of the mobile machine 12, such as location, speed, direction, acceleration, engine RPM, engine temperature, oil pressure, or outside air temperature, all with respect to time. The attribute information 28 may be stored in the storage 24 manually, by an owner of the mobile machine 12; automatically, by a processing device monitoring attributes of the mobile machine 12; or by authorized entity, such as mechanics, manufacturers, or the like. Access control codes that are determined by local laws and regulations, or by manufacturers, may be used. The access control codes may govern the type of attribute information 28 and identify which attribute information 28 can be deleted, modified, or stored.

In one embodiment, communications between the mobile device 14 and the mobile machine 12 are permitted only if the mobile device 14 and the mobile machine 12 are in a commerce zone 42. The commerce zone 42 may be defined by any mechanism capable of quantifying an area, a region, or even an entire state. In one embodiment, for example, the commerce zone 42 may be defined by data that comprises GPS coordinates, such as a longitude, a latitude, and/or an altitude of a particular location, and a radius. In another example, the commerce zone 42 may be defined by four GPS coordinates that define the corners of a rectangular commerce zone 42. Those of skill in the art will recognize that these are merely exemplary, and that the commerce zone 42 may have any desired shape, and be quantified in any suitable manner. The commerce zone 42 may be relatively small, and may comprise, for example, an area surrounding a house, an area surrounding a rental car agency, an area surrounding a car dealership, or an area that is less than a square mile. In alternative embodiments, the commerce zone 42 may be expanded to cover several towns, a particular ZIP Code, a plurality of ZIP Codes, or even an entire state.

While FIG. 1 has been discussed in the context of communications with a mobile machine, embodiments herein are also applicable to communications between a mobile device and a stationary machine. As used herein, the phrase "stationary machine" shall refer to a machine which in operation does not change location, although it is possible for a stationary machine to be moved and/or to have moving parts. Examples of stationary machines may include, but are not limited to: 1) an HVAC unit that has wireless capabilities and a processor either attached or coupled to it; 2) an industrial smelter that has wireless capabilities and a processor either attached or coupled to it; 3) a processor that collects maintenance and/or inspection records, is located in a house or commercial building, and has wireless capabilities; and 4) a wind turbine that generates clean energy and has wireless capabilities and an attached processor. Communications with a stationary machine may be performed substantially similarly, or identically, to those discussed herein with reference to the mobile machine 12.

Figure 2:
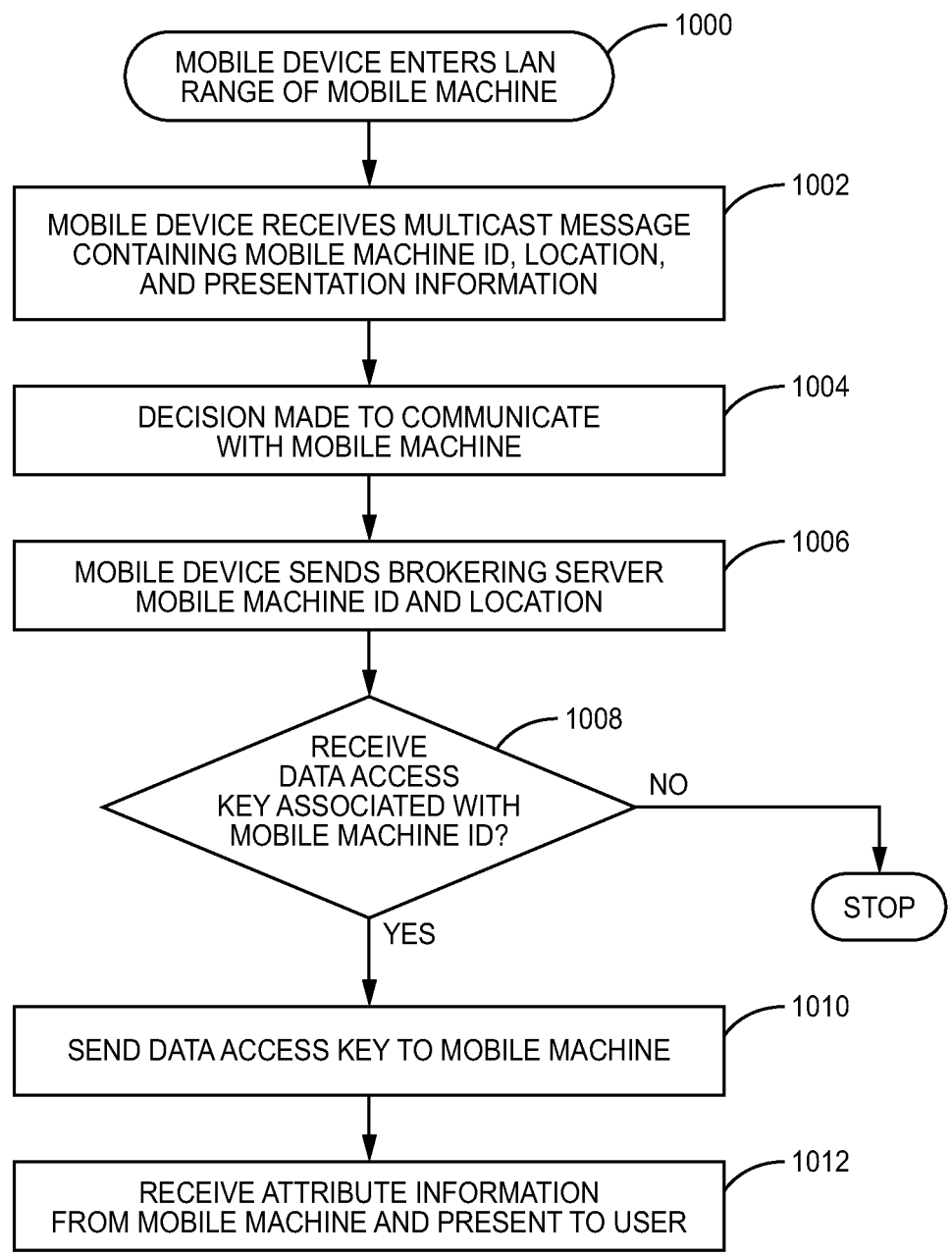
FIG. 2 is a flowchart illustrating an exemplary process for brokering, e.g., managing, communications between a mobile device and a mobile machine according to one embodiment.

FIG. 2 is a flowchart illustrating an exemplary process for brokering communications between the mobile device 14 and the mobile machine 12 according to one embodiment. For exemplary purposes, FIG. 2 will be discussed in conjunction with FIG. 1 regarding the mobile machine 12, but the discussion is equally applicable to communications between the mobile device 14 and a stationary machine. Assume that the mobile machine 12 is an automobile that is being offered for sale by a private owner. Assume further that the owner has registered the mobile machine 12 with the brokering service 18. The registration may occur, for example, via an application executing on the owner's computer. For example, the brokering service 18 may, via the brokering server 20, provide an application that may be accessed via a web browser on the owner's computer. Alternately, the registration may occur, for example, via the mobile machine 12.

The owner enters information about the mobile machine 12 and may pay a fee requested by the brokering service 18. The owner may also provide the brokering server 20 with information quantifying the area surrounding the owner's home as the commerce zone 42. For example, the owner may determine longitude and latitude coordinates of the owner's house and provide such coordinates to the brokering server 20, along with a radius sufficient to encompass a driveway and the street in front of the house. The owner may be able to provide information quantifying multiple commerce zones 42, such as the area encompassing the parking lot where the automobile is typically parked during normal work hours. The commerce zone information may also include timeframes during which communications within the commerce zones 42 are authorized. The brokering server 20 stores information, such as machine information, that identifies machines such as the mobile machine 12, and provides the owner with a unique authorization indication, such as a data access key associated with the mobile machine 12. The owner stores the data access key in the storage 24 using, for example, a laptop computer, as discussed above with regard to storing the preauthorization information 26 in the storage 24. In another embodiment, the brokering server 20 may wirelessly communicate the data access key to the mobile machine 12 via the WAN 22, along with the preauthorization information 26 which may have been entered by the owner. Assume further that the preauthorization information 26 has been previously stored in the storage 24.

Assume that a user of the mobile device 14 enters the commerce zone 42 and comes within range of the wireless LAN 16 (step 1000). The mobile device determines, or otherwise discovers, the mobile machine 12. In one embodiment, the mobile machine 12 may periodically broadcast, such as by multicasting, a message that the mobile machine 12 has attribute information 28 about the mobile machine 12. The message may also include the preauthorization information 26, and may include location information of the mobile machine 12. The mobile device 14 receives the multicast message, including the mobile machine ID 34, the presentation information 30, and the location (step 1002).

The mobile device 14 displays the presentation information 30 on the display 32. The mobile device 14 may alert the user with an audio alarm, or may cause the mobile device 14 to vibrate, for example. Assume the user views the presentation information 30 and is interested in obtaining attribute information 28 from the mobile machine 12. Alternately, the presentation information 30 may be audio and/or video information which is sent from the mobile machine 12, received by the mobile device 14, and played to the user. The user indicates to the mobile device 14 to attempt to communicate with the mobile machine 12 (step 1004). For example, the mobile device 14 may provide an "Accept" option or a "Reject" option along with the display of the presentation information 30 to enable the user to indicate a desire to obtain attribute information 28 from the mobile machine 12 or to prevent further communication with the mobile machine 12.

The mobile device 14 may have the address of the brokering server 20 preconfigured in the mobile device 14. For example, the functionality described herein with respect to the mobile device 14 may be provided, for example, by an application that is obtained from the brokering service 18, or provided by a particular entity, such as a rental car company. In one embodiment, in order to communicate with any mobile machine 12, the user of the mobile device 14 first registers with the brokering service 18, and then downloads an application from the brokering server 20 that enables the mobile device 14 to communicate with mobile machines 12 that have registered with the brokering service 18.

The mobile device 14 sends a message to the brokering server 20 which may include, for example, the mobile machine ID 34, the location information, a password, or a device ID of the mobile device 14 (step 1006). In one embodiment, because the communications between the mobile device 14 and the mobile machine 12 are via a LAN 16, and therefore the mobile device 14 is in proximity to the mobile machine 12 when the mobile device 14 receives the mobile machine ID 34, the location information may be generated by the mobile device 14 rather than by the mobile machine 12.

The brokering server 20 determines that the mobile machine ID 34 is a proper mobile machine ID 34 by comparing the mobile machine ID 34 to machine information stored in the brokering server 20, and uses the mobile machine ID 34 to obtain information associated with the mobile machine 12. In particular, the brokering server 20 may confirm that the location information provided by the mobile device 14 is within the commerce zone 42. If not, the brokering server 20 may send the mobile device 14 a message rejecting the attempt to communicate further with the mobile machine 12. Alternately, the brokering server 20 may just not respond to the mobile device 14. Assuming that the mobile machine ID 34 is appropriate, and that the location information indicates that communications are taking place in the commerce zone 42, the brokering server 20 may provide the mobile device 14 with a data access key that may be used to obtain attribute information 28 from the mobile machine 12. Preferably, communications between the mobile device 14 and the brokering server 20 are via the WAN 22. Any suitable protocol, such as, for example, HTTP or HTTPS, may be used to facilitate communications.

Thus, the mobile device 14 may receive a rejection from the brokering server 20, may receive no response from the brokering server 20, or may receive a data access key (step 1008). If either no response or a rejection is received, processing may stop, or, if the mobile device 14 receives additional messages from other mobile machines 12, the process described herein may repeat with respect to such other mobile machines 12. Assume that the mobile device 14 received a data access key for the mobile machine 12 from the brokering server 20. The mobile device 14 sends the data access key to the mobile machine 12 (step 1010). The mobile machine 12 receives the data access key, and in return sends the attribute information 28 to the mobile device 14. The mobile device 14 receives the attribute information 28 and presents the attribute information 28 on the display 32 to the user (step 1012). In another embodiment, the mobile device 14 may not register with a brokering service 18, but instead may contain an application or applications allowing it to receive and view presentation information and/or attribute information. The presentation information and/or attribute information may be transmitted by the mobile machine 12 without requiring a data access key to view it as long as the mobile device 14 is located in the commerce zone 42.

Figure 3:
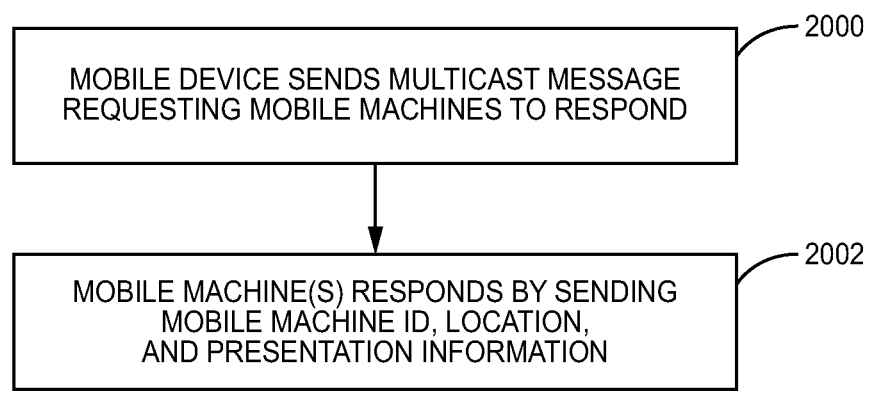
FIG. 3 is a flowchart illustrating another exemplary process for brokering communications between a mobile device and a mobile machine.

FIG. 3 is a flowchart illustrating another exemplary process for managing communications between the mobile device 14 and the mobile machine 12. FIG. 3 will also be discussed in conjunction with FIG. 1. In this embodiment, the mobile device 14 determines, or otherwise discovers, the mobile machine 12 by broadcasting, such as by multicasting, a message that requests any mobile machine 12 to respond if the mobile machine 12 desires to communicate with the mobile device 14 (step 2000). The mobile machine 12 receives the multicast message, and responds with the location information and the preauthorization information 26, which may include the presentation information 30 and the mobile machine ID 34 (step 2002). The mobile device 14 receives the preauthorization information 26, and processing may continue substantially as described herein with regard to FIG. 2 above.

FIG. 4 is a block diagram of a system 44 in which additional embodiments disclosed herein may be practiced. The system 44 includes the mobile device 14, the brokering server 20, and the WAN 22, as described with regard to FIG. 1. In this embodiment, however, there are multiple mobile machines 46A-46D (generally, mobile machine 46 or mobile machines 46) in a commerce zone 48. The commerce zone 48 may comprise, for example, the parking area of a car rental agency. Thus, the mobile machines 46 may comprise rental cars. Each mobile machine 46 comprises preauthorization information 26 and attribute information 28. In this embodiment, however, a local mobile machine aggregator 50 aggregates the information available from the mobile machines 46 and registers the mobile machines 46 with the brokering server 20 via the WAN 22. The brokering service 18, in this embodiment, may, for example, be a broker that provides such a service to local or national car rental agencies. The mobile machine aggregator 50 may be located within or external to the commerce zone 48.

The mobile device 14 enters the commerce zone 48 and receives the preauthorization information 26 from each of the mobile machines 46. As discussed with regard to FIGS.

2 and 3, the mobile machines 46 may multicast the preauthorization information 26 periodically, or may respond to a request for such information from the mobile device 14. FIG. 5A illustrates an exemplary user interface 52 containing a plurality of entries 54A-54D (generally, entry 54 or entries 54) which may be displayed on the display 32 according to one embodiment. Assume that each of the mobile machines 46 provides the mobile device 14 with certain preauthorization information 26 which corresponds to the respective mobile machine 46. In this example, the preauthorization information 26 may comprise the mobile machine 1034 of the respective mobile machine 46, the model of the rental vehicle, the color, and/or the license plate number, so that the user can visually correlate the particular mobile machine 46 with a corresponding entry 54. While not depicted in FIG. 5A, the preauthorization information 26 may also include graphical information, such as a thumbnail image corresponding to the particular mobile machine 12, which may be displayed in the user interface 52. The mobile device 14 receives the preauthorization information 26 and displays in the user interface 52 a plurality of entries 54A-54D, each of which corresponds to one of the mobile machines 46. For purposes of illustration, assume that the entry 54A corresponds to the mobile machine 46A, the entry 548 with the mobile machine 46B, the entry 54C with the mobile machine 46C, and the entry 54D with the mobile machine 46D. In one embodiment, the mobile machine aggregator 50 may provide the preauthorization information 26 on behalf of the mobile machines 46.

Assume that the user selects, such as by touching, the entry 54B. The mobile device 14 sends the brokering server 20 the mobile machine 1034 of the mobile machine 46B and the location of the mobile device 14. The brokering server 20 confirms that the location is within the commerce zone 48, and sends to the mobile device 14 the data access key corresponding to the mobile machine 46B. The mobile device 14 provides the data access key to the mobile machine 46B. The mobile machine 46B sends the attribute information 28B to the mobile device 14. The mobile device 14 displays the attribute information 28B on the display 32.

Figure 5B:
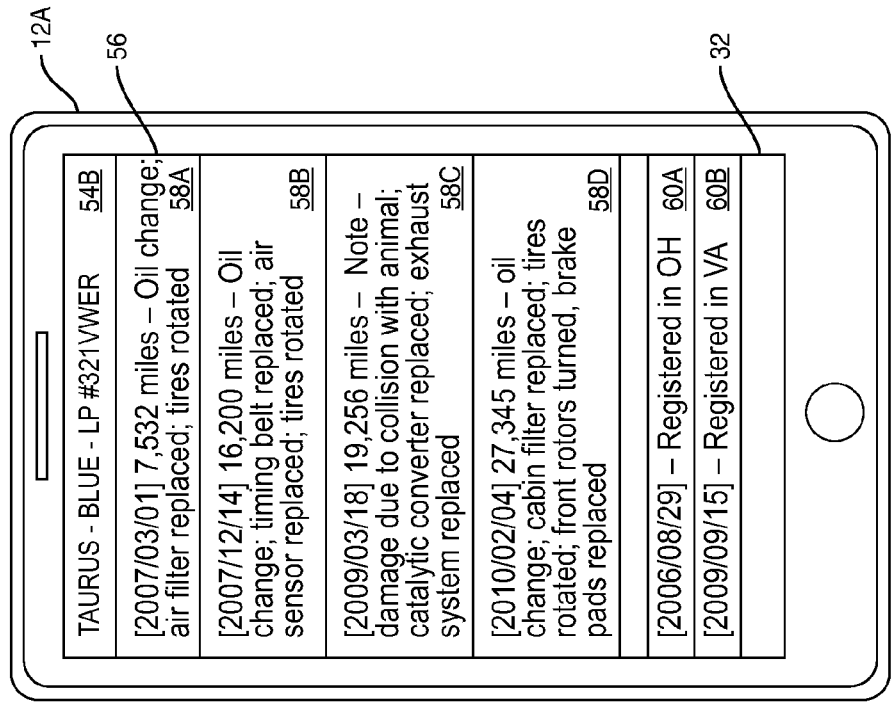
FIG. 5B illustrates another exemplary user interface which may be displayed on the display to provide attribute information to a user.
Figure 5A:
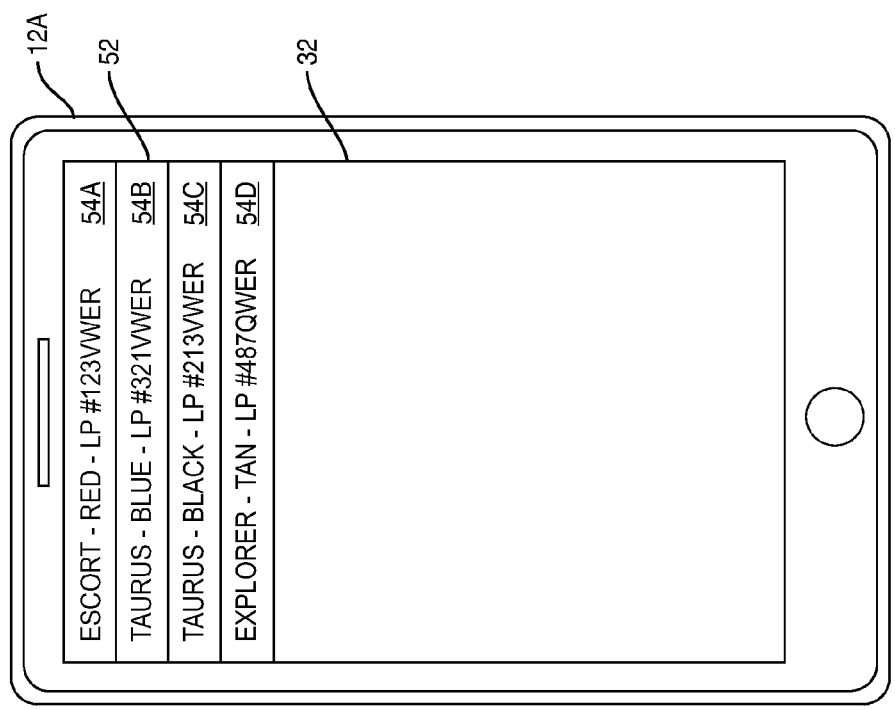
FIG. 5A illustrates an exemplary user interface containing a plurality of entries which may be displayed on a display according to one embodiment.

FIG. 5B illustrates an exemplary user interface 56 which may be displayed on the display 32 to provide the attribute information 28B to the user. The user interface 56 includes a plurality of maintenance records 58A-58D (generally, maintenance record 58 or maintenance records 58), each of which identifies a maintenance service that was performed on the mobile machine 46B on an earlier date. The maintenance records 58 may identify any pertinent information associated with the maintenance that was performed, such as the date, the mileage on the odometer of the mobile machine 46B at the time the maintenance was performed, and the particular actions performed on the mobile machine 46B. The user interface 56 may also include a plurality of state registration records 60A-60B (generally, state registration record 60 or state registration records 60), each of which indicates a date and a state where the mobile machine 46B was previously registered. Those of skill in the art will recognize that the maintenance records 58 and state registration records 60 are merely exemplary attribute information 28, and that any desired information that is unique to the mobile machine 46B may be stored and provided to the mobile device 14, such as, for example, location, speed, direction, acceleration, engine RPM, engine temperature, oil pressure, or outside air temperature, all with respect to time.

In one embodiment, the mobile device 14 and the mobile machine 12 limit communications to occur only within a predefined commerce zone. In such embodiment, the mobile device 14 may not need to provide the location to the brokering server 20 because the mobile device 14 and the mobile machine 12 verify, or otherwise ensure, that they are in the predefined commerce zone prior to initiating communications. Alternately, the mobile device 14 may send the location information to the brokering server 20 as an additional verification that communications are occurring in a predefined commerce zone. Zone information may be communicated to the mobile device 14 and the mobile machine 12 periodically via the WAN 22. Such information may be broadcast, via a multicast for example, to mobile devices 14 and mobile machines 12 that are in a cell tower coverage area that includes a commerce zone. In an alternate embodiment, the mobile machines 12 may periodically query the brokering server 20 to obtain the zone information. The mobile device 14 and the mobile machine 12, upon receiving the zone information, may store the zone information in a local storage, such as a random access memory and/or persistent memory such as a hard drive. The mobile device 14 may periodically determine its geographic location, and determine whether the geographic location is within a commerce zone. If so, the mobile device 14 may send out a broadcast asking for responses from any mobile machines 12 that desire to communicate with the mobile device 14. Alternately, the mobile device 14 may receive a message from a mobile machine 12 and, upon doing so, may first determine whether the mobile device 14 is within a commerce zone. If not, the mobile device 14 may disregard the message. Similarly, the mobile machine 12 may only initiate communications, or respond to communications, with the mobile device 14 upon verification that the mobile machine 12 is within a predefined commerce zone.

Figure 6:
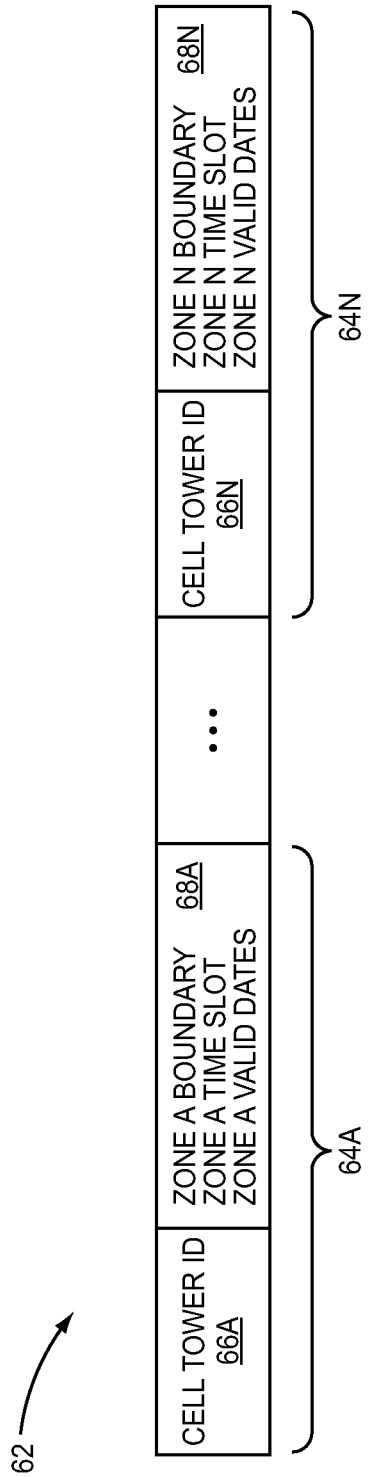
FIG. 6 is a block diagram of exemplary zone information that may be periodically broadcast from a cell tower to mobile machines and mobile devices within the cell coverage area of the cell tower.

FIG. 6 is a block diagram of exemplary zone information 62 that may be periodically broadcast from a cell tower to mobile machines 12 and mobile devices 14 within the cell coverage area of the cell tower. The zone information 62 may contain a plurality of commerce zone records 64A-64N, each of which identifies a commerce zone that is located at least in part within the cell coverage area of the cell tower broadcasting the zone information 62, or in an adjacent cell coverage area. The commerce zone record 64A, for example, may contain cell tower identifier (ID) data 66A identifying the cell tower coverage area in which the commerce zone is at least partially located. The commerce zone record 64A may also contain commerce zone location data 68A, which identifies the location of the respective commerce zone, such as the commerce zones 42, 48. As discussed previously, the commerce zone location data 68A may identify the location of the corresponding commerce zone in any suitable manner, such as, for example, by GPS coordinates. The commerce zone location data 68A may also identify time slot data identifying one or more time frames during which the corresponding commerce zone is active. For example, the owner of the mobile machine 12 may desire that the mobile machine 12 provide attribute information 28 only between 8:00 am and 5:30 pm. The commerce zone location data 68A may also identify a date range during which the commerce zone is valid. For example, during registration with the brokering service 18, an owner of a mobile machine 12 may pay for a predefined number of days during which the brokering server 20 will broker communications between the mobile machine 12 and the mobile devices 14.

Similarly, the commerce zone record 64N may contain cell tower ID data 66N identifying the cell tower coverage area in which the commerce zone is at least partially located, which may, for example, be a cell tower adjacent to the cell tower broadcasting the zone information 62. The commerce zone record 64N may also contain commerce zone location data 68N, which may identify both the location of the respective commerce zone and time slot data identifying one or more time frames during which the corresponding commerce zone is active.

While for purposes of illustration the zone information 62 comprises only two commerce zone records, it is apparent that the zone information 62 may comprise hundreds, or even thousands, of commerce zone records, each of which may correspond to a different commerce zone.

Figure 7:
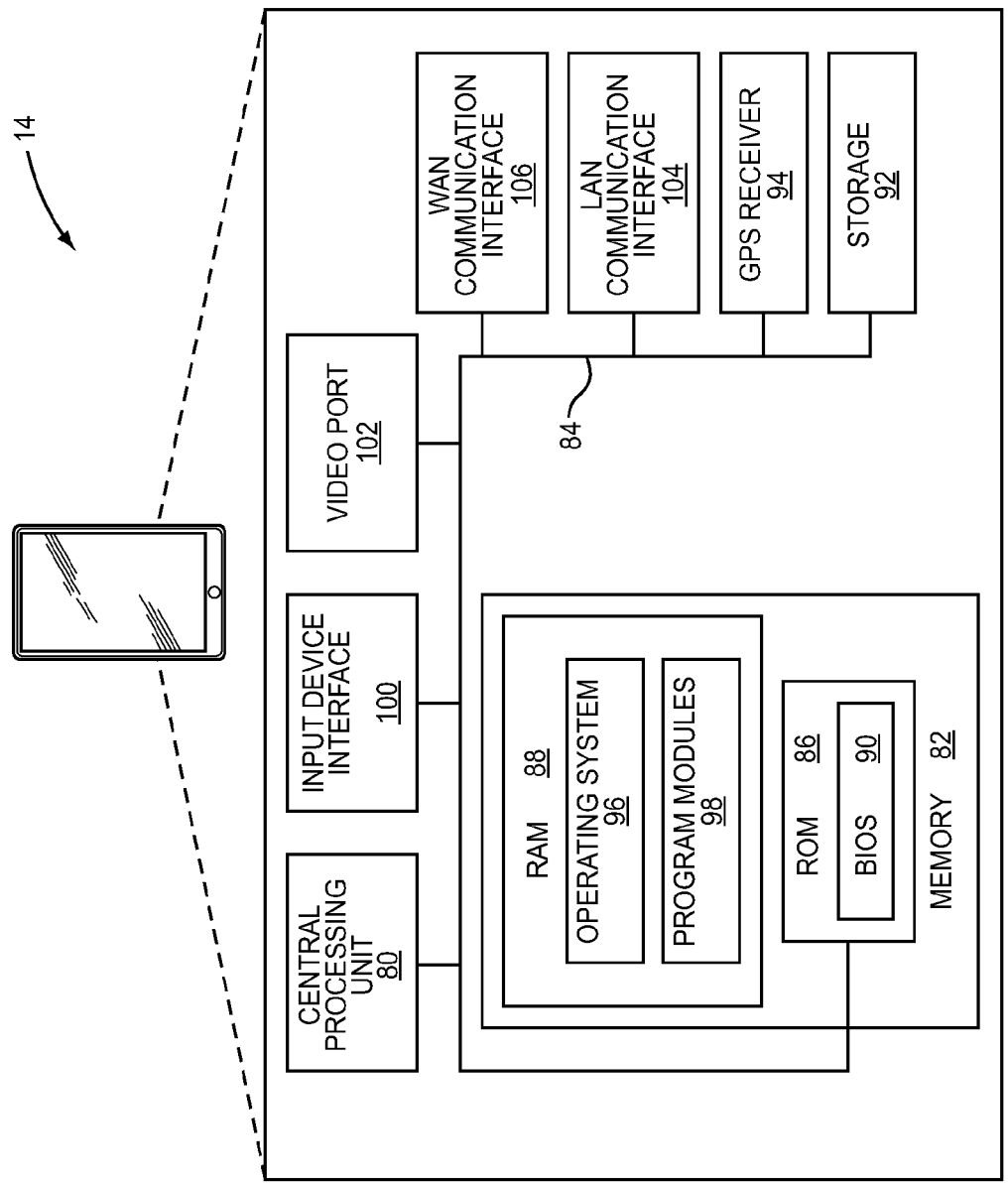
FIG. 7 illustrates an exemplary mobile device according to one embodiment.

FIG. 7 illustrates an exemplary mobile device 14 according to one embodiment. The mobile device 14 may comprise, for example, a laptop computer, a cellular phone or smart phone, a personal digital assistant (PDA), an Apple® iPad™ or the like. In addition to components discussed previously herein, the exemplary mobile device 14 may also include a central processing unit 80, a system memory 82, and a system bus 84. The system bus 84 provides an interface for system components including, but not limited to, the system memory 82 and the central processing unit 80. The central processing unit 80 can be any of various commercially available or proprietary processors. Dual microprocessors and other multi-processor architectures may also be employed as the central processing unit 80.

The system bus 84 may be any of several types of bus structures that may further interconnect to a memory bus (with or without a memory controller), a peripheral bus, and/or a local bus using any of a variety of commercially available bus architectures. The system memory 82 may include non-volatile memory 86 (e.g., read only memory (ROM), erasable programmable read only memory (EPROM), electrically erasable programmable read only memory (EEPROM), etc.) and/or volatile memory 88 (e.g., random access memory (RAM)). A basic input/output system (BIOS) 90 may be stored in the non-volatile memory 86, and can include the basic routines that help to transfer information between elements within the mobile device 14. The volatile memory 88 may also include a high-speed RAM such as static RAM for caching data.

The mobile device 14 may further include a storage 92, which may comprise, for example, an internal hard disk drive (HOD) (e.g., enhanced integrated drive electronics (EIDE) or serial advanced technology attachment (SATA)) for storage, flash memory, or the like. The zone information 62, for example, may be stored in the storage 92. The drives and associated computer-readable and computer-usable media provide non-volatile storage of data, data structures, computer-executable instructions, and so forth. For the mobile device 14, the drives and media accommodate the storage of any data in a suitable digital format. Although the description of computer-readable media above refers to an HOD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

The mobile device 14 may include a global positioning system (GPS) receiver 94 which enables the mobile device 14 to determine, among other things, whether the mobile device 14 is in a commerce zone. The GPS receiver 94 may also provide timestamp information that identifies the current time of day, which may be used by the mobile device 14 for comparison to time slot data associated with a commerce zone.

A number of program modules can be stored in the drives and in the volatile memory 88, including an operating system 96 and one or more program modules 98, which may implement the functionality described herein in whole or in part, including, for example, functionality associated with communicating with the mobile machine 12, functionality associated with determining whether the mobile device 14 is in a commerce zone, functionality for communicating with the brokering server 20, and other processing and functionality described herein. It is to be appreciated that the embodiments can be implemented with various commercially available operating systems 96 or combinations of operating systems 96. All or a portion of the embodiments may be implemented as a computer program product, such as a computer-usable or computer-readable medium having a computer-readable program code embodied therein. The computer-readable program code can include software instructions for implementing the functionality of the embodiments described herein. The central processing unit 80, in conjunction with the program modules 98 in the volatile memory 88, may serve as a control system for the mobile device 14 that is configured to, or adapted to, implement the functionality described herein.

A user may be able to enter commands and information into the mobile device 14 through one or more input devices, such as, for example, a touch sensitive display 32, a keyboard (not illustrated), or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 80 through an input device interface 100 that is coupled to the system bus 84 but can be connected by other interfaces such as a parallel port, an IEEE 1394 serial port, a game port, a universal serial bus (USB) port, an IR interface, etc.

The mobile device 14 may drive a separate or integral display 32, which may also be connected to the system bus 84 via an interface, such as a video port 102. The mobile device 14 includes a LAN communication interface 104 for communicating with a wireless LAN or wireless personal area network technology, including, for example, Wi-Fi®, Bluetooth®, or ZigBee®. The LAN communication interface 104, among other features, allows the mobile device 14 to communicate with the mobile machine 12. The mobile device 14 includes a WAN communication interface 106 for communicating with one or more desired WAN technologies, such as, for example, 3G or 4G data telecommunications technologies.

Figure 8:
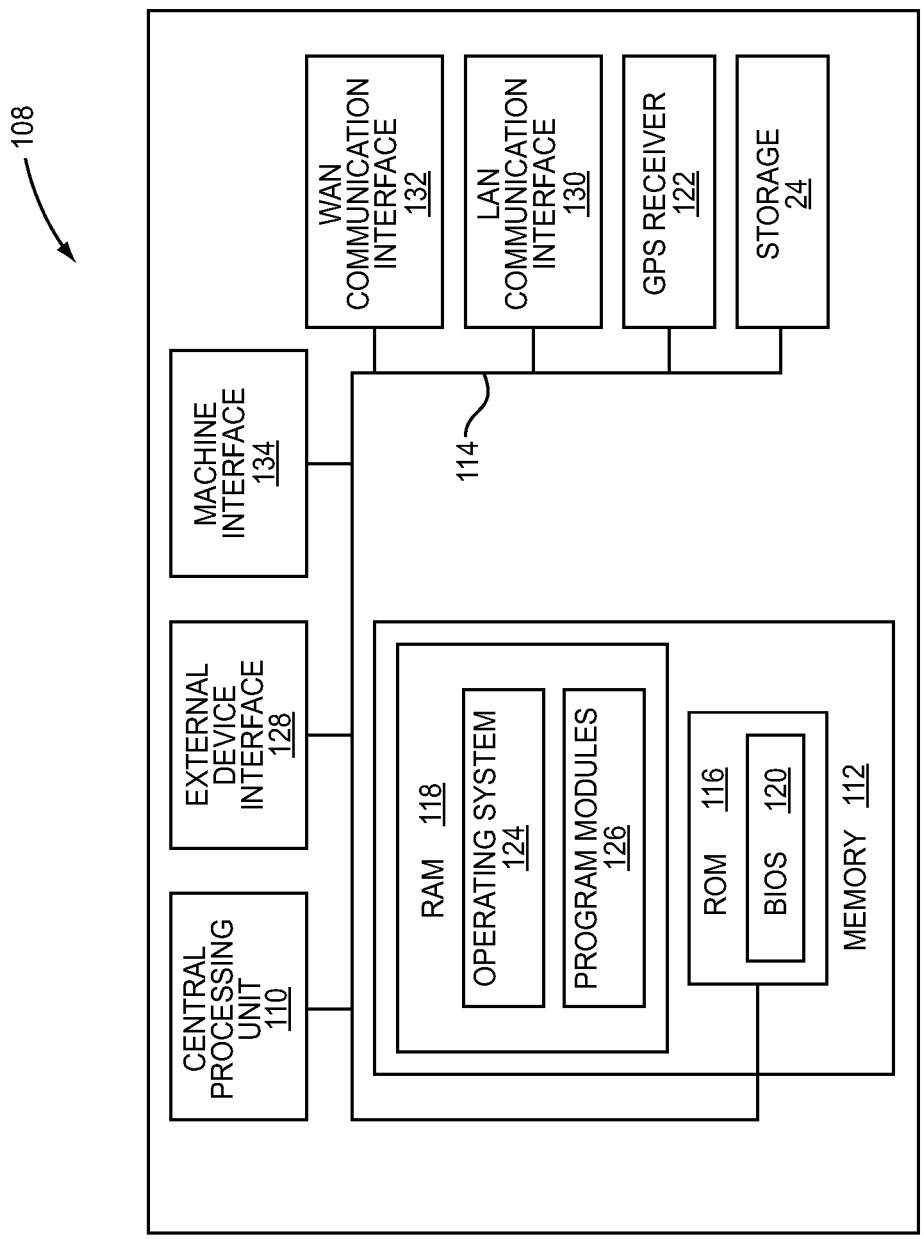
FIG. 8 illustrates an exemplary module which may be used to implement functionality described herein in a mobile machine.

FIG. 8 illustrates an exemplary module 108 which may be used to implement functionality described herein in the mobile machine 12. The module 108 includes a central processing unit 110, a system memory 112, and a system bus 114. The system bus 114 provides an interface for system components including, but not limited to, the system memory 112 and the central processing unit 110. The central processing unit 110 can be any of various commercially available or proprietary processors. Dual microprocessors and other multi-processor architectures may also be employed as the central processing unit 110.

The system bus 114 may be any of several types of bus structures that may further interconnect to a memory bus (with or without a memory controller), a peripheral bus, and/or a local bus using any of a variety of commercially available bus architectures. The system memory 112 may include non-volatile memory 116 (e.g., read only memory (ROM), erasable programmable read only memory (EPROM), electrically erasable programmable read only memory (EEPROM), etc.) and/or volatile memory 118 (e.g., random access memory (RAM)). A basic input/output system (BIOS) 120 may be stored in the non-volatile memory 116, and can include the basic routines that help to transfer information between elements within the module 108. The volatile memory 118 may also include a high-speed RAM such as static RAM for caching data.

The module 108 may further include the storage 24, which may comprise, for example, an internal hard disk drive (HOD) (e.g., enhanced integrated drive electronics (EIDE) or serial advanced technology attachment (SATA)) for storage, flash memory, or the like. The zone information 62, the preauthorization information 26, and the attribute information 28, for example, may be stored in the storage 24. The drives and associated computer-readable and computer-usable media provide non-volatile storage of data, data structures, computer-executable instructions, and so forth. For the module 108, the drives and media accommodate the storage of any data in a suitable digital format. Although the description of computer-readable media above refers to an HOD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

The module 108 may include a GPS receiver 122 which enables the module 108 to determine, among other things, whether the mobile machine 12 is in a commerce zone. The GPS receiver 122 may also provide timestamp information that identifies the current time of day which may be used by the module 108 for comparison to time slot data associated with a commerce zone.

A number of program modules can be stored in the drives and volatile memory 118, including an operating system 124 and one or more program modules 126, which may in whole or in part implement the functionality described herein, including, for example, functionality associated with communicating with the mobile device 14, functionality associated with determining whether the mobile machine 12 is in a commerce zone, functionality for communicating with the brokering server 20, and other processing and functionality described herein. It is to be appreciated that the embodiments can be implemented with various commercially available operating systems or combinations of operating systems. All or a portion of the embodiments may be implemented as a computer program product, such as a computer-usable or computer-readable medium having a computer-readable program code embodied therein. The computer-readable program code can include software instructions for implementing the functionality of the embodiments described herein. The central processing unit 110, in conjunction with the program modules 126 in the volatile memory 118, may serve as a control system for the module 108 that is configured to, or adapted to, implement the functionality described herein.

A user may be able to enter commands and information into the module 108 by connecting to the module 108 via an external device interface 128, which may comprise, for example, a USB port or a serial port. The user may be able to couple a computing device, such as a laptop computer, to the external device interface 128 via a suitable cable, and store desired information, such as the preauthorization information 26 and/or the attribute information 28, in the storage 24.

The module 108 may include a LAN communication interface 130 for communicating with a wireless LAN or wireless personal area network technology, including, for example, Wi-Fi®, Bluetooth®, or ZigBee®. The LAN communication interface 130 provides a means to communicate with the mobile device 14, and may also provide an alternate means for a user to enter data into the storage 24. The module 108 may include a WAN communication interface 132 for communicating with one or more desired WAN technologies, such as, for example, 3G or 4G data telecommunications technologies. The WAN communication interface 132, among other features, enables the mobile machine 12 to communicate with the brokering server 20. The module 108 may include a machine interface 134 which may enable the module 108 to communicate with other electronic processing capabilities of the mobile machine 12.

Figure 9:
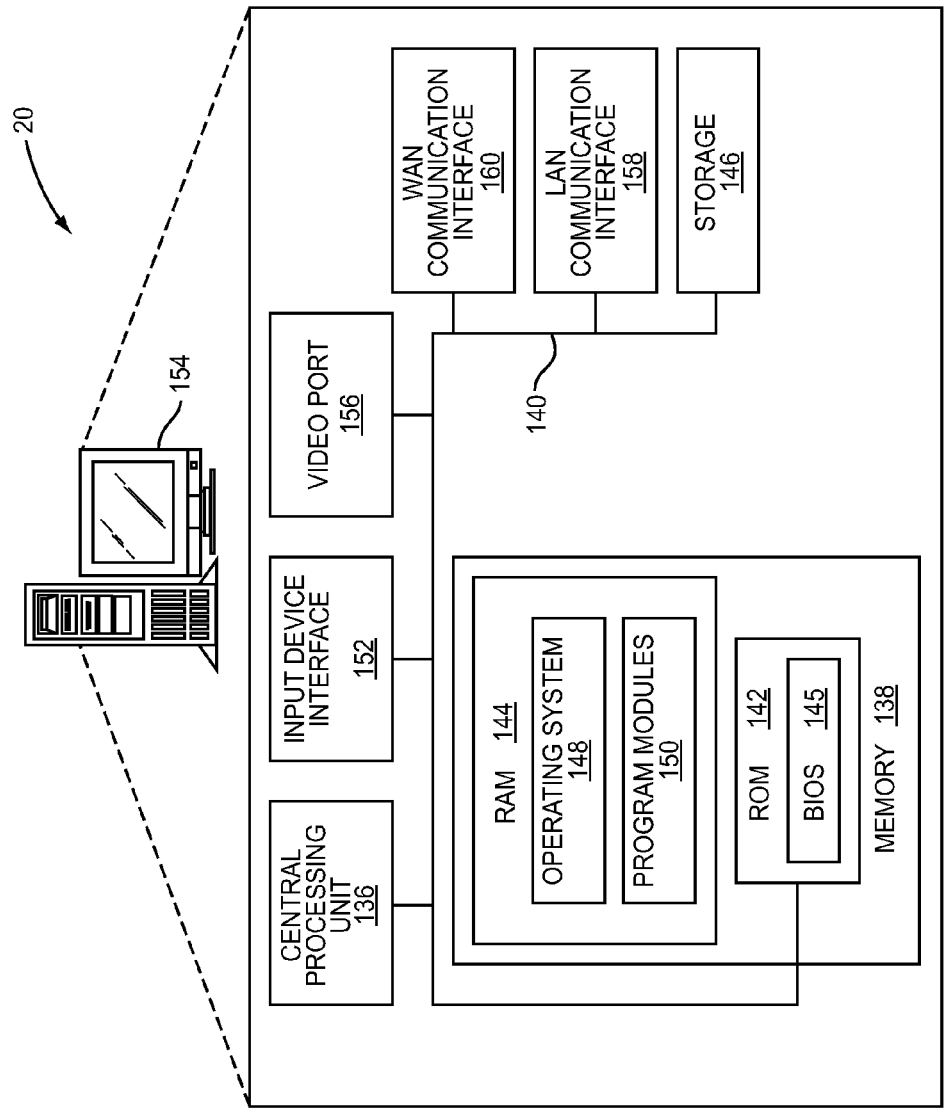
FIG. 9 illustrates an exemplary server according to one embodiment.

FIG. 9 illustrates an exemplary server, such as the brokering server 20, according to one embodiment. The brokering server 20 may comprise, for example, a laptop computer, a desktop computer, a workstation, a proprietary mainframe computer, a telecommunications switch, or the like. In addition to components discussed previously herein, the exemplary brokering server 20 may also include a central processing unit 136, a system memory 138, and a system bus 140. The system bus 140 provides an interface for system components including, but not limited to, the system memory 138 and the central processing unit 136. The central processing unit 136 can be any of various commercially available or proprietary processors. Dual microprocessors and other multi-processor architectures may also be employed as the central processing unit 136.

The system bus 140 may be any of several types of bus structures that may further interconnect to a memory bus (with or without a memory controller), a peripheral bus, and/or a local bus using any of a variety of commercially available bus architectures. The system memory 138 may include non-volatile memory 142 (e.g., read only memory (ROM), erasable programmable read only memory (EPROM), electrically erasable programmable read only memory (EEPROM), etc.) and/or volatile memory 144 (e.g., random access memory (RAM)). A basic input/output system (BIOS) 145 may be stored in the non-volatile memory 142, and can include the basic routines that help to transfer information between elements within the brokering server 20. The volatile memory 144 may also include a high-speed RAM such as static RAM for caching data.

The brokering server 20 may further include a computer-readable storage 146, which may comprise, for example, an internal hard disk drive (HOD) (e.g., enhanced integrated drive electronics (EIDE) or serial advanced technology attachment (SATA)) for storage, flash memory, or the like. The zone information 62 identifying commerce zones, for example, may be stored in the computer-readable storage 146. The drives and associated computer-readable and computer-usable media provide non-volatile storage of data, data structures, computer-executable instructions, and so forth. For the brokering server 20, the drives and media accommodate the storage of any data in a suitable digital format. Although the description of computer-readable media above refers to an HOD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and in the volatile memory 144, including an operating system 148 and one or more program modules 150, which may implement the functionality described herein in whole or in part, including, for example, functionality associated with communicating with the mobile machine 12 or mobile device 14, functionality associated with determining whether the mobile machine 12 or mobile device 14 is in a commerce zone 42, functionality for providing an authorization indication to the mobile device 14, and other processing and functionality described herein. It is to be appreciated that the embodiments can be implemented with various commercially available operating systems 148 or combinations of operating systems 148.

All or a portion of the embodiments may be implemented as a computer program product, such as a computer-usable or computer-readable medium having a computer-readable program code embodied therein. The computer-readable program code can include software instructions for implementing the functionality of the embodiments described herein. The central processing unit 136, in conjunction with the program modules 150 in the volatile memory 144, may serve as a control system for the brokering server 20 that is configured to, or adapted to, implement the functionality described herein.

A user may be able to enter commands and information into the brokering server 20 through one or more input devices, such as, for example, a touch sensitive display, a keyboard (not illustrated), or a pointing device, such as a mouse (not illustrated). Other input devices (not illustrated) may include a microphone, an infrared (IR) remote control, a joystick, a game pad, a stylus pen, or the like. These and other input devices are often connected to the central processing unit 136 through an input device interface 152 that is coupled to the system bus 140, but can be connected by other interfaces such as a parallel port, an IEEE 1394 serial port, a game port, a universal serial bus (USB) port, an IR interface, etc.

The brokering server 20 may drive a separate or integral display 154, which may also be connected to the system bus 140 via an interface, such as a video port 156. The brokering server 20 includes a LAN communication interface 158 for communicating with a wireless LAN or wireless personal area network technology, including, for example, Wi-Fi®, Bluetooth®, or ZigBee®. The brokering server 20 also preferably includes a WAN communication interface 160 for communicating with one or more desired WAN technologies, such as, for example, 3G or 4G data telecommunications technologies, via which the brokering server 20 may communicate with the mobile device 14 or mobile machine 12.

Those skilled in the art will recognize improvements and modifications to the preferred embodiments of the present disclosure. All such improvements and modifications are considered within the scope of the concepts disclosed herein and the claims that follow.

What is claimed is:

1. A method comprising:
   receiving, by a mobile device, a plurality of machine identifiers (IDs) for a plurality of machines;
   wirelessly receiving, by the mobile device, zone identification information identifying a predefined commerce zone;
   determining, by the mobile device, a current location of the mobile device;
   determining that the current location is within the predefined commerce zone based on the zone identification information identifying the predefined commerce zone wherein the predefined commerce zone defines a geographic area;
   selecting a first machine of the plurality of machines;
   sending, by the mobile device, the machine ID of the first machine and the location of the mobile device to a server;
   receiving, by the mobile device, an authorization indication from the server that authorizes communication with the first machine;
   wirelessly sending, by the mobile device, the authorization indication to the first machine; and
   in response to sending the authorization indication, receiving, by the mobile device from the first machine, attribute information about the first machine.

2. The method of claim 1, further comprising receiving, by the mobile device, preauthorization information from at least one of the plurality of machines that comprises presentation information and the machine ID for the at least one of the plurality of machines.

3. The method of claim 2, further comprising displaying, by the mobile device, the presentation information on a display.

4. The method of claim 3, further comprising receiving, by the mobile device, instructions that the mobile device obtain the attribute information from the first machine.

5. The method of claim 1, wherein communications between the mobile device and the server are via a wireless wide area network (WAN).

6. The method of claim 1, wherein the first machine comprises a mobile machine.

7. The method of claim 1, wherein the attribute information comprises data identifying previous maintenance performed on the first machine.

8. The method of claim 1, wherein receiving, by the mobile device, the machine ID from the first machine further comprises:
   receiving, by the mobile device, a plurality of machine IDs including the first machine ID, each machine ID corresponding to a different machine of a plurality of machines; and
   displaying information about each of the plurality of machines on a display.

9. The method of claim 8, further comprising receiving, by the mobile device, input from a user selecting the first machine from the plurality of machines.

10. The method of claim 1, wherein the first machine is at least one of an automobile, a truck, a boat, and an airplane.

11. The method of claim 10, wherein the attribute information includes at least one of maintenance records, accident records, and information regarding movement of the first machine including at least one of speed, acceleration, engine revolutions per minute (RPM), and a total mileage that the first machine has been operated.

12. A computer program product, comprising a non-transitory computer-usable medium having a computer-readable program code embodied therein, the computer-readable program code adapted to be executed on a processor to implement a method, the method comprising:
   receiving, by a mobile device, a plurality of mobile machine identifiers (IDs) of a plurality of mobile machines;
   receiving, by the mobile device, zone identification information identifying a predefined commerce zone, wherein the predefined commerce zone defines a geographic area;

determining, by the mobile device. a current location of the mobile device;

determining that the current location is within the predefined commerce zone based on the zone identification information identifying the predefined commerce zone;

selecting a first mobile machine of the plurality of mobile machines;

sending, by the mobile device, the mobile machine ID obtained from the first mobile machine and the current location of the mobile device to a server;

receiving, by the mobile device, an authorization indication from the server that authorizes communication with the first mobile machine;

wirelessly sending, by the mobile device, the authorization indication to the first mobile machine; and in response to sending the authorization indication, receiving, by the mobile device from the first mobile machine, attribute information about the first mobile machine.

13. The computer program product of claim 12, wherein the method further comprises:

receiving, by the mobile device, preauthorization information from at least one of the plurality of mobile machines that comprises presentation information and the machine ID for the at least one of the plurality of mobile machines.

14. The computer program product of claim 13, wherein the method further comprises:

displaying, by the mobile device, the presentation information on a display.

15. The computer program product of claim 12, wherein the first machine is at least one of an automobile, a truck, a boat, and an airplane.

16. The method of claim 15, wherein the attribute information includes at least one of maintenance records, accident records, and information regarding movement of the first machine including at least one of speed, acceleration, engine revolutions per minute (RPM), and a total mileage that the first machine has been operated.

17. A mobile device, comprising:

a communication interface adapted to communicatively couple the mobile device to a network;

at least one processor; and at least one memory storing software executable by the at least one processor wherein the mobile device is adapted to:

wirelessly discover a plurality of mobile machines, each mobile machine adapted to wirelessly communicate attribute information about the mobile machine upon receipt of an authorization indication;

wirelessly receive zone identification information identifying a predefined commerce zone, wherein the predefined commerce zone defines a geographic area;

determine, by the mobile device, a current location of the mobile device;

determine that the current location is within the predefined commerce zone based on the zone identification information identifying the predefined commerce zone;

select a first machine of the plurality of machines;

wirelessly send a mobile machine identifier (ID) obtained of the first mobile machine to a brokering server;

receive the authorization indication from the brokering server that authorizes communication with the first mobile machine;

wirelessly send the authorization indication to the first mobile machine; and in response to sending the authorization indication, receive wirelessly the attribute information from the first mobile machine, wherein the attribute information identifies attributes of the first mobile machine.

18. The mobile device of claim 17, wherein the mobile device further comprises a display, and wherein the mobile device is further adapted to:

receive identifying information from the first mobile machine that comprises presentation information and the mobile machine ID; and display the presentation information on the display.

19. The computer program product of claim 17, wherein the first machine is at least one of an automobile, a truck, a boat, and an airplane.

20. The method of claim 19, wherein the attribute information includes at least one of maintenance records, accident records, and information regarding movement of the first machine including at least one of speed, acceleration, engine revolutions per minute (RPM), and a total mileage that the first machine has been operated.

* * * * *